(12) United States Patent
Kuroki et al.

(10) Patent No.: US 11,990,164 B1
(45) Date of Patent: May 21, 2024

(54) TAPE HEAD ASSEMBLY WITH SINGLE BEAM, ACTUATOR AND SPRING ADAPTOR

(71) Applicant: Western Digital Technologies, Inc., San Jose, CA (US)

(72) Inventors: Kenji Kuroki, Fujisawa (JP); Oscar J. Ruiz, San Jose, CA (US); Eduardo Torres Mireles, San Jose, CA (US); Robert G. Biskeborn, Hollister, CA (US); Masahito Kobayashi, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/227,520

(22) Filed: Jul. 28, 2023

Related U.S. Application Data (60) Provisional application No. 63/442,971, filed on Feb. 2, 2023.

(51) Int. Cl.
| | |
|---|---|
| *G11B 5/56* | (2006.01) |
| *G11B 5/008* | (2006.01) |
| *G11B 5/54* | (2006.01) |
| *G11B 20/20* | (2006.01) |

(52) U.S. Cl.
CPC ............ *G11B 5/56* (2013.01); *G11B 5/00813* (2013.01); *G11B 20/20* (2013.01)

(58) Field of Classification Search
CPC ..... G11B 21/103; G11B 5/00813; G11B 5/56; G11B 5/4813; G11B 15/6885; G11B 5/60; G11B 15/1883; G11B 5/54; G11B 5/5504; G11B 5/53

USPC .............................................. 360/270, 255.4
See application file for complete search history.

(56) References Cited

U.S. PATENT DOCUMENTS

| | | | |
|---|---|---|---|
| 5,862,014 A | 1/1999 | Nute | |
| 5,905,613 A | 5/1999 | Biskeborn et al. | |
| 6,781,792 B2 | 8/2004 | Biskeborn | |
| 7,518,831 B2 | 4/2009 | Moore et al. | |
| 7,894,161 B2 | 2/2011 | Biskeborn | |
| 7,983,007 B2 * | 7/2011 | Tanaka ............... | G11B 5/00826 360/270 |
| 8,879,209 B2 | 11/2014 | Biskeborn et al. | |

* cited by examiner

OTHER PUBLICATIONS

Chang, Jen-Yuan, "Mechanics of flexible interconnect in lateral tape open drives", Springer, Jun. 2012, pp. 1-4.

*Primary Examiner* — Nabil Z Hindi
(74) *Attorney, Agent, or Firm* — PATTERSON + SHERIDAN, LLP (57) ABSTRACT

The present disclosure is generally related to a tape drive comprising a tape head assembly. The tape head assembly comprises a spring adaptor, the spring adaptor comprising a first hole, a second hole, and a spring member disposed between the first hole and the second hole, a beam disposed within the first hole of the spring adaptor, a first module disposed on the beam, the first module comprising a first plurality of write transducers and a first plurality of read transducers, a second module disposed on the beam adjacent to the first module, the second module comprising a second plurality of write transducers and a second plurality of read transducers, and an actuator disposed in the first hole. The actuator is controllable to move the beam in a direction transverse to a media movement direction. The spring adaptor stabilizes the beam while the beam is being actuated.

22 Claims, 8 Drawing Sheets

TAPE HEAD ASSEMBLY WITH SINGLE BEAM, ACTUATOR AND SPRING ADAPTOR

CROSS-REFERENCE TO RELATED APPLICATIONS

This application claims benefit of U.S. provisional patent application Ser. No. 63/442,971, filed Feb. 2, 2023, which is herein incorporated by reference.

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In a tape drive system, the quantity of data stored on a magnetic tape may be increased by increasing the number of data tracks across the tape that the tape head is capable of writing to. By overlapping portions of data tracks (e.g., shingling data tracks), improvements to data storage quantities can be achieved. However, for various reasons, enabling read-verify for conventional tape heads requires use of two or more separate head structures, where one structure writes the data and the other read-verifies the data. A drawback is that the separate structures in conventional heads must be very precisely assembled to enable this function. Generally, each head structure is disposed on a separate beam. The beams support the heads during writing and reading data. However, accurately aligning the two beams in order to align the two head structures can be difficult and time consuming, resulting in the head structures being mis-aligned.

Therefore, there is a need in the art for a tape head configured to write and read verifying data within a single head structure.

SUMMARY OF THE DISCLOSURE

The present disclosure is generally related to a tape drive comprising a tape head assembly. The tape head assembly comprises a spring adaptor, the spring adaptor comprising a first hole, a second hole, and a spring member disposed between the first hole and the second hole, a beam disposed within the first hole of the spring adaptor, a first module disposed on the beam, the first module comprising a first plurality of write transducers and a first plurality of read transducers, a second module disposed on the beam adjacent to the first module, the second module comprising a second plurality of write transducers and a second plurality of read transducers, and an actuator disposed in the first hole. The actuator is controllable to move the beam in a direction transverse to a media movement direction. The spring adaptor stabilizes the beam while the beam is being actuated.

In one embodiment, a tape head assembly comprises a beam, a first module disposed on the beam, the first module comprising a first plurality of write transducers and a first plurality of read transducers, a second module disposed on the beam adjacent to the first module, the second module comprising a second plurality of write transducers and a second plurality of read transducers, an actuator disposed in contact with a first end of the beam, the actuator being controllable to move the beam in a first direction towards a second end of the beam and a second direction opposite to the first direction, the second end of the beam being opposite the first direction, and a spring adaptor disposed around the beam and the actuator.

In another embodiment, a tape head assembly comprises a spring adaptor, the spring adaptor comprising a first hole, a second hole, and a spring member disposed between the first hole and the second hole, a beam disposed within the first hole of the spring adaptor, the beam being disposed in contact with the spring member, a first module disposed on the beam, the first module comprising a first plurality of write transducers and a first plurality of read transducers, a second module disposed on the beam adjacent to the first module, the second module comprising a second plurality of write transducers and a second plurality of read transducers, and an actuator disposed in the first hole adjacent to a first end of the beam, the actuator being controllable to move the beam in a first direction towards the spring member and a second direction opposite to the first direction.

In yet another embodiment, a tape drive comprises a tape head assembly, the tape head assembly comprising: a spring adaptor, the spring adaptor comprising a first hole, a second hole, and a spring member disposed between the first hole and the second hole, a beam disposed within the first hole of the spring adaptor, the beam being disposed in contact with the spring member, a first same gap verify (SGV) module disposed on the beam, the first SGV module comprising a first plurality of write transducers and a first plurality of read transducers, a second SGV module disposed on the beam adjacent to the first SGV module, the second SGV module comprising a second plurality of write transducers and a second plurality of read transducers, and an actuator disposed in the first hole, the actuator being disposed in contact with a first surface of the beam, and a controller configured to: control the actuator to move the beam in a first direction transverse to a direction a media moves and a second direction opposite to the first direction, control the first SGV module to write data to the media using the first plurality of write transducers and the read verify the data using the first plurality of read transducers, and control the second SGV module to write data to the media using the second plurality of write transducers and the read verify the data using the second plurality of read transducers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a tape drive comprising a tape head assembly. The tape head assembly comprises a spring adaptor, the spring adaptor comprising a first hole, a second hole, and a spring member disposed between the first hole and the second hole, a beam disposed within the first hole of the spring adaptor, a first module disposed on the beam, the first module comprising a first plurality of write transducers and a first plurality of read transducers, a second module disposed on the beam adjacent to the first module, the second module comprising a second plurality of write transducers and a second plurality of read transducers, and an actuator disposed in the first hole. The actuator is controllable to move the beam in a direction transverse to a media movement direction. The spring adaptor stabilizes the beam while the beam is being actuated.

Figure 1A:
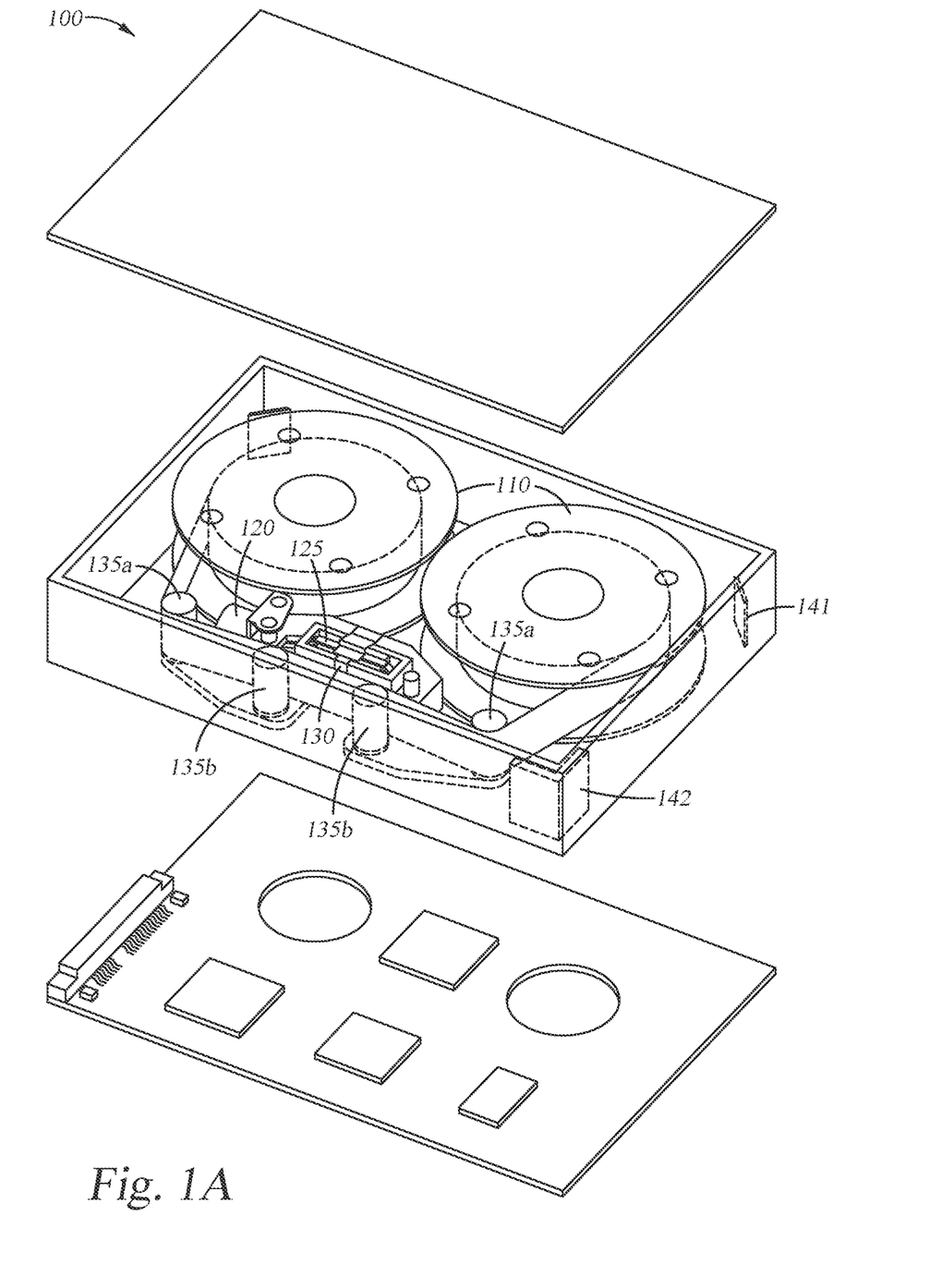
FIGS. 1A-1C illustrate a perspective exploded view, a simplified top down, and side profile view of a tape drive, in accordance with some embodiments.
Figure 1B:
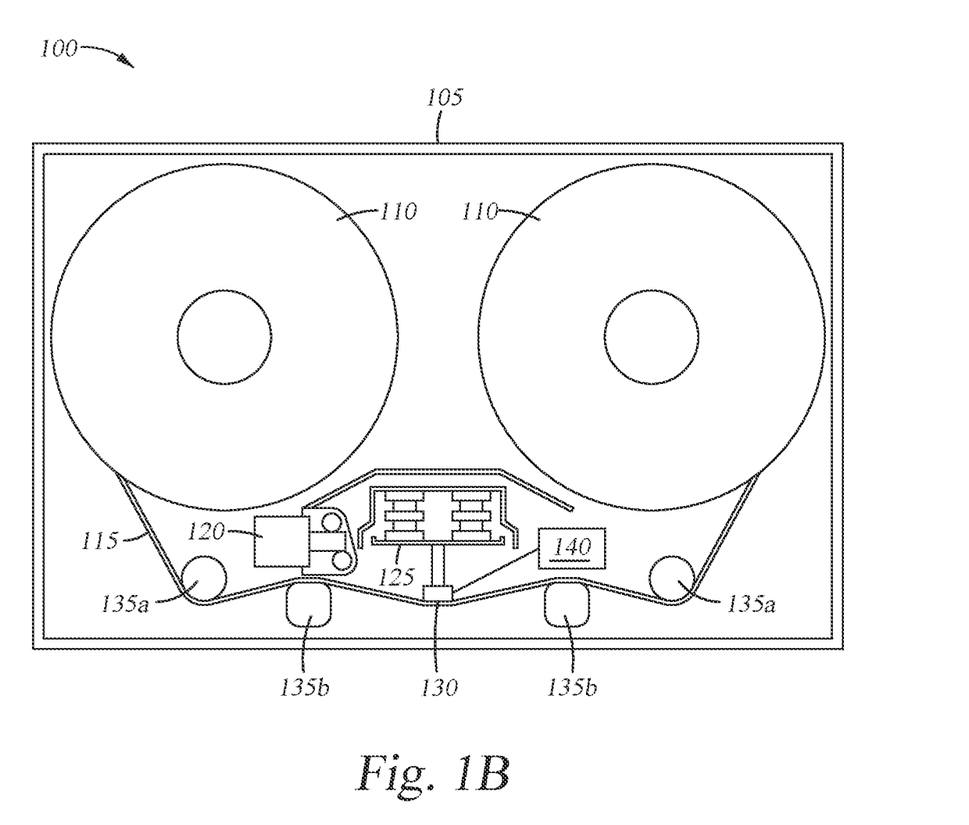
Figure 1C:
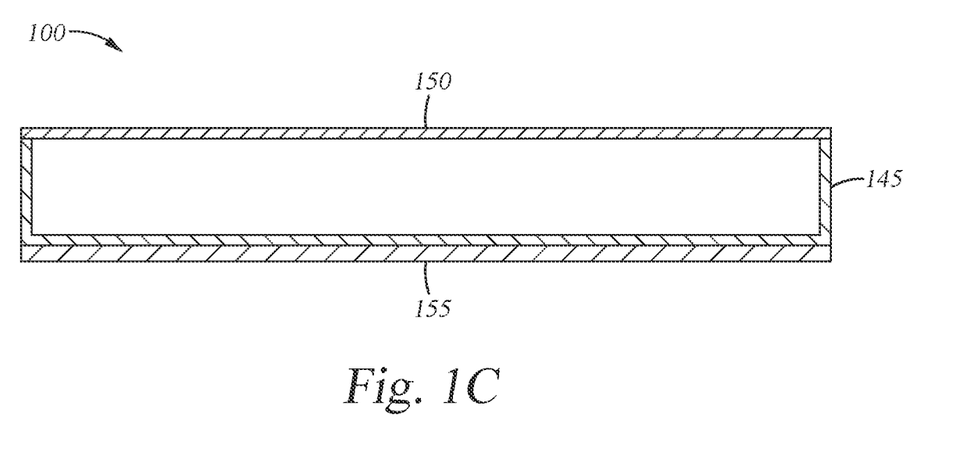

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
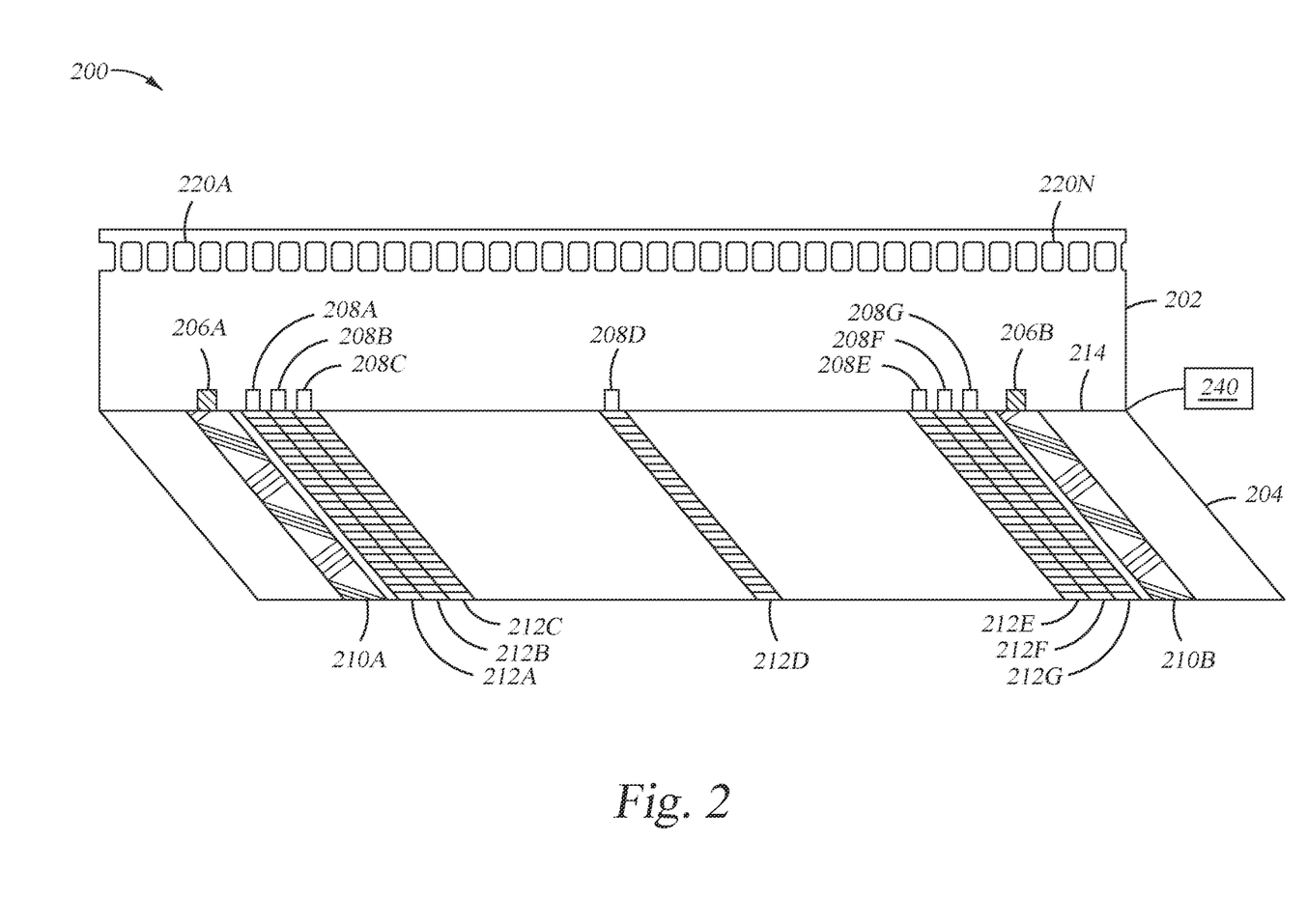
FIG. 2 is a schematic illustration of a tape head and tape that are aligned.

FIG. 2 is a schematic illustration of a portion of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller 240, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head module 200.

The tape 204 comprises a first servo track 210A and a second servo track 210B. The first servo track 210A and the second servo track 210B are spaced apart allowing the tape head module 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape head module 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
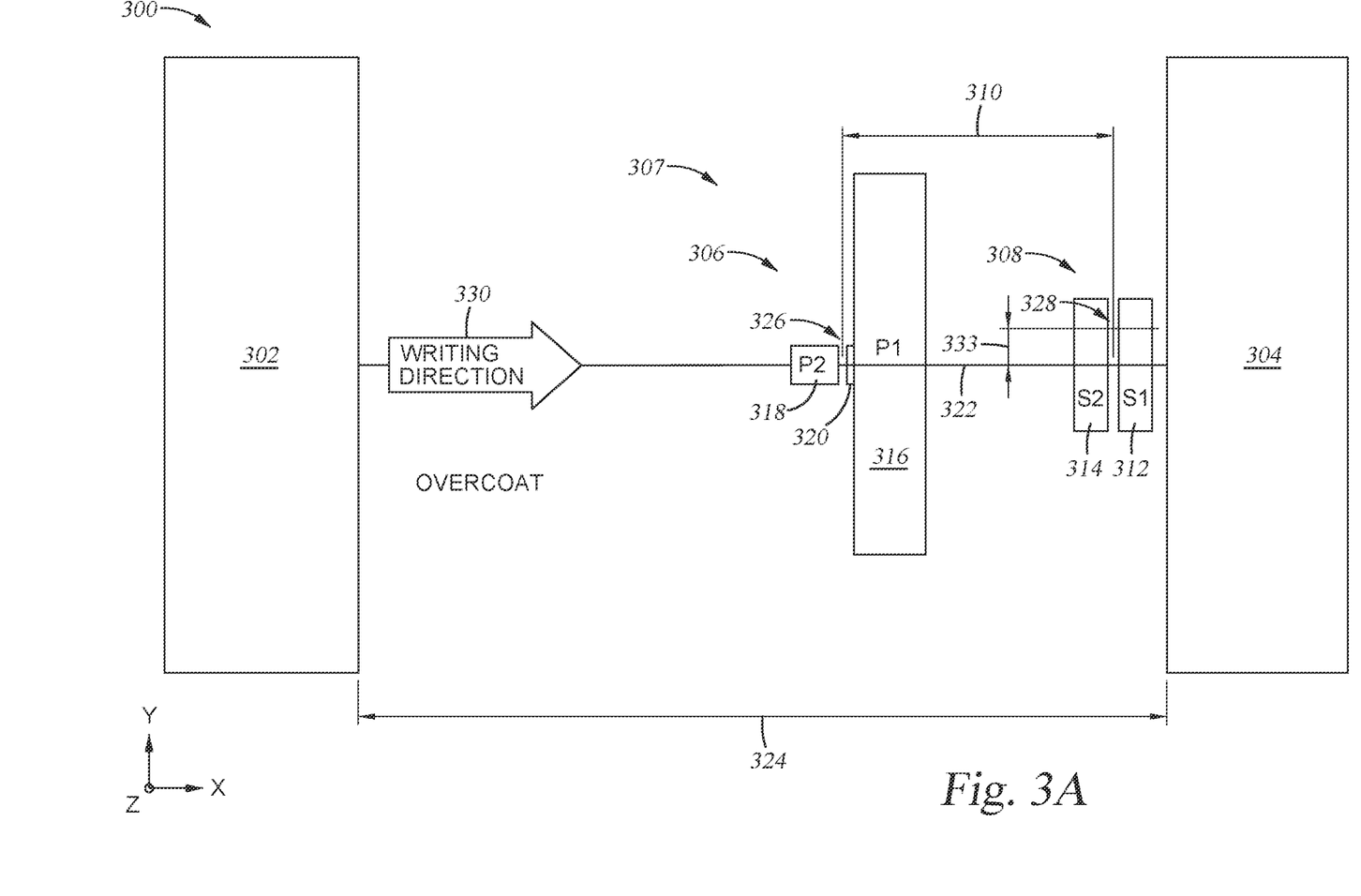
FIGS. 3A-3B illustrate a media facing surface (MFS) view of same gap verify (SGV) modules, respectively, according to various embodiments.
Figure 3B:
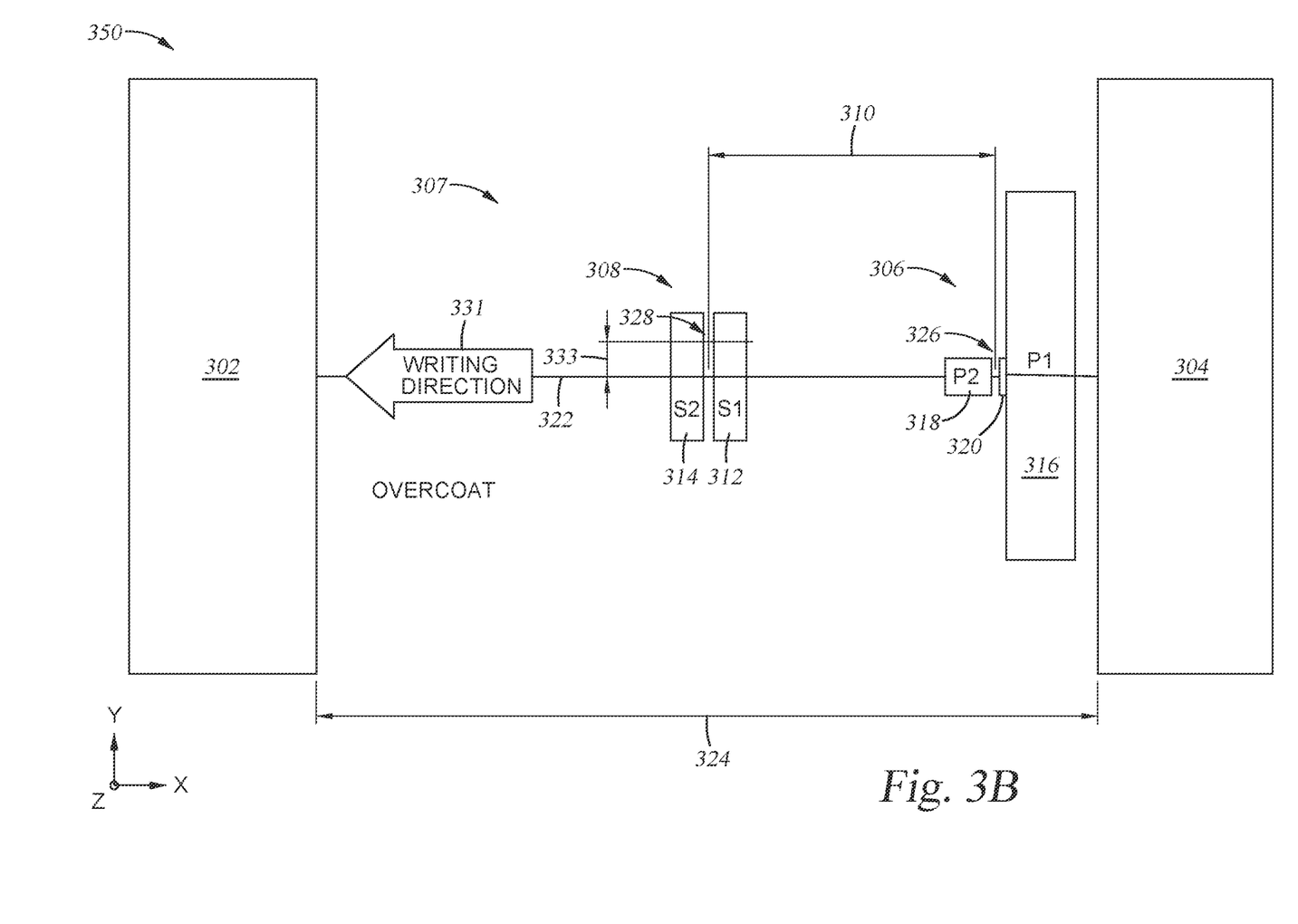

FIGS. 3A-3B illustrate a media facing surface (MFS) view of same gap verify (SGV) modules 300, 350, respectively, according to various embodiments. The SGV modules 300, 350 may be utilized within a tape drive comprising a controller, such as the TED or tape drive 100 of FIG. 1A. The SGV modules 300, 350 may be the tape head module 200 of FIG. 2. While SGV embodiments are shown in FIGS. 3A-3B, it is noted that the single beam tape head embodiments disclosed herein are applicable for non-SGV modules as well. Such non-SGV modules may include modules that have multiple reader, writer, and servo elements such as the reader element is not used to verify data written by corresponding writer element of the same module.

The SGV module 300 comprises a closure 302, one or more write transducers 306 disposed adjacent to the closure 302, one or more read transducers 308 disposed adjacent to the one or more write transducers 306, and a substrate 304 disposed adjacent to the one or more read transducers 308. The SGV module 350 comprises a closure 302, one or more read transducers 308 disposed adjacent to the closure 302, one or more write transducers 306 disposed adjacent to the one or more read transducers 308, and a substrate 304 disposed adjacent to the one or more write transducers 306. Each of the one or more write transducers 306 and the one or more read transducers 308 are disposed on the substrate 304. The write transducer(s) 306 may be referred to as a writer(s) 306 or write head(s) 306, and the read transducer(s) 308 may be referred to as a reader(s) 308 or read head(s) 308.

While only one writer 306 and one reader 308 pair is shown in FIGS. 3A-3B, the SGV module 300 may comprise a plurality of writer 306 and reader 308 pairs, which may be referred to as a head array. For example, in some embodiments, the SGV modules 300, 350 each comprises a head array of 32 writers 306 and 32 readers 308, forming 32 writer 306 and reader 308 pairs, along with one or more servo readers (not shown). In each of the SGV modules 300, 350, each writer 306 a width 307 in the x-direction of about 5 μm to about 10 μm.

In each of the SGV modules 300, 350, a writer 306 is spaced a distance 310 from a reader 308 of about 6 μm to about 20 μm, such as about 6 μm to about 15 μm. In embodiments comprising a plurality of writer 306 and a plurality of reader 308 pairs, each writer 306 is spaced the distance 310 from an adjacent paired reader 308. The closure 302 is spaced a distance 324 from the substrate 304 of about 20 μm to about 60 μm. In some embodiments, a shield 332 is disposed between the writer 306 and the reader 308 of each pair to reduce cross-talk signals to the reader 308 from the writer 306. The shield 332 may comprise permalloy and may be combined with Ir for wear resistance, for example.

Each of the writers 306 comprises a first write pole P1 316 and a second write pole P2 318. A notch 320 may be disposed on the P1 316. The notch 320 is disposed adjacent to a write gap 326, where the P1 316 is spaced from the P2 318 by a distance in the x-direction at least twice the length of the write gap 326. Each of the readers 308 comprises a first shield S1 312, a second shield S2 314, and a magnetic sensor 328 disposed between the S1 312 and the S2 314. The magnetic sensor 328 may be a tunnel magnetoresistance (TMR) sensor, for example. The write gap 326 and the magnetic sensor 328 are aligned or centered upon a center axis 322 in the y-direction such that the center axis 322 is aligned with a centerline of the write gap 326 and a centerline of the magnetic sensor 328. In embodiments in which the SGV module 300 is actively tilted, such as for compensating TDS, the writer 306 and the reader 308 may be offset relative to the center axis. In some embodiments, the distance 310 is measured from the write gap 326 to an MgO layer (not shown) of the magnetic sensor 328.

In the SGV module 300 of FIG. 3A, when writing data to a tape or other media, the tape moves over the writer 306 in the writing direction 330 (e.g., in the x-direction). In the SGV module 350 of FIG. 3B, when writing data to a tape or other media, the tape moves over the writer 306 in the writing direction 331 (e.g., in the −x-direction). Due at least in part to the distance 310 between the write gap 326 and the magnetic sensor 328 of a writer 306 and reader 308 pair, the writer 306 is able to write to the media, and the reader 308 is able to read the data to verify the data was written correctly. As discussed above, the shield 332 may be used to further reduce magnetic cross-talk between the writer 306 and the reader 308. Thus, the writer 306 is able to write data to a portion of the tape, and the paired reader 308 is able to read verify the newly written portion of the tape immediately. As such, the SGV module 300 is able to write data to and read verify data from a tape concurrently. The SGV module 350, similar constructed, also has this immediate verify capability.

The SGV modules 300, 350 are each able to concurrently write and read data due in part to the separation distance 310 between the write gap 326 and the magnetic sensor 328 of a writer 306 and reader 308 pair. The write gap 326 and magnetic sensor 328 are spaced far enough apart that the amplitude of signals in the reader 308 that arise from coupling of magnetic flux from the paired writer 306 is reduced or substantially less than the readback signal of the reader 308 itself.

As used herein, the SGV modules 300, 350 being able to "concurrently" write and read data refers to the fact that both the writer 306 and the reader 308 are concurrently turned "on" or able to operate simultaneously with respect to various data written to a tape. However, it is to be noted that the writer 306 and the reader 308 are not "concurrently" operating on the same data at the same time. Rather, the writer 306 first writes data, and as the tape moves over the reader 308, the reader 308 is then able to read verify the newly written data as the writer 306 concurrently writes different data to a different portion of the tape. Furthermore, it is to be noted that a controller (not shown) is configured to operate the SGV modules 300, 350, and as such, the controller is configured to independently operate both the writer 306 and the reader 308. Thus, while the writer 306 is described as writing data and the reader 308 is described as reading the data, the controller enables the writer 306 to write and enables the reader 308 to read.

While the SGV modules 300, 350 are discussed as being SGV modules, each SGV module 300, 350 may further operate in a legacy mode, where the writers 306 may write data and the readers 308 may later read the data, without operating concurrently.

Figures 4A, 4B:
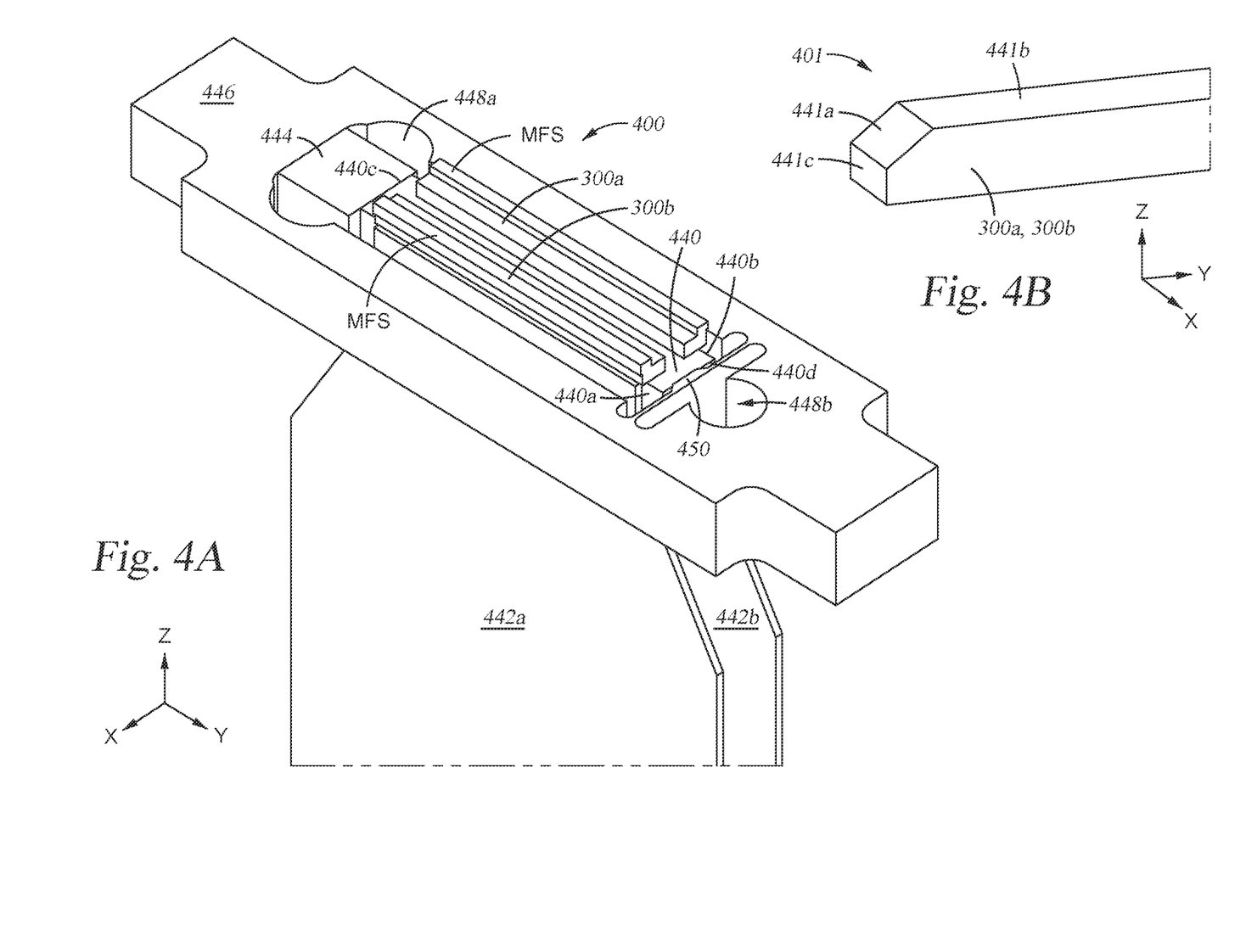
FIG. 4A illustrates a perspective MFS view of a tape head assembly, according to one embodiment.
FIG. 4B illustrates an alternative beam that may be used in some embodiments in place of the beam shown in FIG. 4A.

FIG. 4A illustrates a perspective MFS view of a tape head assembly 400, according to one embodiment. The tape head assembly 400 may be utilized within a tape drive comprising a controller, such as the TED or tape drive 100 of FIG. 1A. The tape head assembly 400 may comprise one or more of the tape head modules 200 of FIG. 2. For the purpose of illustration and teaching, the disclosure will primarily describe the inclusion of multiple SGV modules in the various tape head assembly embodiments. It is noted that the tape head assembly embodiments of FIGS. 4A-5D are not limited to SGV modules and other non-SGV head modules may be so mounted on the single beam of the tape head assembly as well. The tape head assembly 400 comprises a first SGV module 300a and a second SGV module 300b, of FIG. 3A. However, in some embodiments, the tape head assembly 400 may instead comprise a first SGV module 350a and a second SGV module 350b of FIG. 3B. The tape head assembly 400 of FIG. 4A may be used in combination with the various layouts 400A-400D shown in FIGS. 5A-5D. The MFS of the tape head assembly 400 is the uppermost surface of each of the SGV modules 300a, 300b, where the uppermost surface of the first SGV module 300a is aligned with the uppermost surface of the second SGV module 300b, forming one MFS that may be separated by a gap.

In FIG. 4A, the x-direction is the direction a media moves when the tape head assembly 400 writes and reads data to the media, and the y-direction is a transverse direction, or the direction the tape head assembly moves across a width of a media during operation. In some embodiments, the tape head assembly 400 is statically tilted, or has a fixed tilt angle with respect to the transversal direction the media moves (e.g., the y-direction), of about 3 degrees to about 10 degrees. The tape head assembly 400 may further be controllable (e.g., by a controller, such as the controller 140 of FIG. 1B or the controller 240 of FIG. 2) to dynamically tilt in the machine direction (e.g., the x-direction) dynamically by about ±0.3 degrees to about ±1.5 degrees. Tilting the tape head assembly 400, dynamically, compensates for changes in a track pitch of the media, which may be caused by tape dimensional instability.

Furthermore, as noted above, the first and second modules 300a, 300b may operate in a legacy mode, and are not required to write and read-verify data concurrently. As such, the first and second modules 300a, 300b may be referred to as a first module 300a and a second module 300b, respectively.

The tape head assembly 400 comprises the first module 300a and the second module 300b disposed on a beam 440. The first and second modules 300a, 300b each individually has a length in the y-direction of about 8 mm. The beam 440 has a length in the y-direction greater than a length of the first and second modules 300a, 300b, such as a length of about 3 mm to about 12 mm. The beam 440 has a width in the x-direction of about 1 mm to about 3 mm. The beam 440 is recessed from the MFS of the modules 300a, 300b. A first flexible printed circuit (FPC) board 442a is recessed from the MFS and attached to a first side or surface 440a of the beam 440. A second FPC board 442b is recessed from the MFS and attached to a second side or surface 440b of the beam 440 opposite the first surface 440a. The first and second FPC boards 442a, 442b extend away from the MFS in the −z-direction.

An actuator 444 is disposed adjacent to a third side or surface 440c of the beam 440. The third surface 440c of the beam 440 is disposed perpendicular to the first and second surfaces 440a, 440b, and connects the first surface 440a to the second surface 440b. The actuator 444 may be a piezo-electric (PZT) actuator 444. The actuator 444 has a length in the y-direction of about 2 mm, a width in the x-direction of about 2 mm, and a height in the z-direction of about 2 mm. The actuator 444 is recessed from the MFS. During operation, the actuator 444 is controllable to move in the y-direction and the −y-direction to accurately position the first and second modules 300a, 300b on the beam 440, as discussed further below.

A spring adaptor 446 is disposed around the beam 440, the actuator 444, and an upper portion of the first and second FPC boards 442a, 442b such that the beam 440, the actuator 444, and an upper portion of the first and second FPC boards 442a, 442b are disposed in a first via, cutout, or hole 448a of the spring adaptor 446. The first hole 448a may have a length in the y-direction of about 5 mm to about 14 mm. A second via, cutout, or hole 448b of the spring adaptor 446 is disposed adjacent to a fourth surface 440d of the beam 440. The first and second holes 448a, 448b extend an entire height of the spring adaptor 446 in the z-direction. The second hole 448b may have a length in the y-direction of about 0.1 mm to about 5 mm. The spring adaptor 446 is recessed from the MFS. The spring adaptor 446 has a length in the y-direction of about 9 mm to about 25 mm, such as about 20 mm.

The spring adaptor 446 further comprises a thin member 450, a compressible member 450, or a spring member 450 disposed in contact with the fourth surface 440d of the beam 440 and adjacent to the second hole 448b. The spring member 450 extends in the x-direction to fully separate the first hole 448a from the second hole 448b. The spring member 450 may have a thickness in the y-direction of about 0.08 mm to about 0.4 mm and a length in the x-direction of about 2.5 mm to about 6 mm.

The spring member 450 is rigid, yet has some flexibility due to its thinness in the y-direction. The spring adaptor 446 and the spring member 450 may comprise alumina, for example. As the actuator 444 moves the beam 440 in a transversal direction with respect to a tape or media (i.e., the y-direction and the −y-direction) to position the first and second modules 300a, 300b, the spring member 450 may act as a spring, compressing or expanding with respect to pressure applied from the actuator 444 without moving in the x-direction or the −x-direction.

By compressing or expanding, the spring member 450 provides stability to the first and second modules 300a, 300b to ensure accurate, minute, or fine positioning of the first and second modules 300a, 300b, increasing the tracks per inch (TPI) capability of the tape head assembly 400. Since both the first and second modules 300a, 300b are disposed on the same beam 440, moving the beam 440 using the actuator 444 ensures the first and second modules 300a, 300b are always aligned, and there is no need to align multiple modules disposed on separate beams. While not shown in FIG. 4A, the voice coil motor 125 of FIG. 1A and stepping motor 120 of FIG. 1A are included in the tape head assembly 300 and/or tape drive for coarse or larger positioning.

FIG. 4B illustrates an alternative body design or MFS 401 for one or more of the modules 300a, 300b that may be used in some embodiments in place of the squared-off MFS shown in FIG. 4A. The alternative MFS 401 (which may be the MFS of either module 300a, 300b, or an MFS of each module 300a, 300b) comprises one or more sloped, chamfered, or beveled surfaces 441a extending away from a first surface 441b that faces a media during operation towards a second surface 441c (near the actuator 444) and/or a third surface (not shown) disposed near the spring member 450. The first surface 441b is substantially perpendicular to the second and third surfaces. The beveled surface 441a connects the first surface 441b to the second surface 441c and/or connects the first surface 441b to the third surface. The beveled surface 441a may be sloped away from the first surface 441b at an angle of about 3 degrees to about 10 degrees.

While only one beveled surface 441a is shown, each end (i.e., an end near the actuator 444 and an end near the spring member 450) of one or more of module 300a, 300b may be beveled or chamfered. Moreover, the beveled surface(s) 441a may extend along the ends of each closure 302a, 30b and/or the ends of each substrate 304a, 304b, where the ends of closures 302a, 302b and the ends of the substrates 304a, 304b are near the actuator 444 and near the spring member 450. The beveled surface(s) 441a on one or more of module 300a, 300b reduce stress on a media to avoid damaging the media.

FIGS. 5A-5D illustrate cross-sectional view of layout or positioning variations of the first and second modules 300a, 300b (which may or may not include the beveled MFS 401 of FIG. 4B) disposed on the beam 440 of the tape head assembly 400 of FIG. 4A, according to various embodiments. Additionally, the first module 350a and the second module 350b of FIG. 3B may be used in place of the first and second modules 300a, 300b. For clarity purposes, aspects of the tape head assembly 400 are not shown in FIGS. 5A-5D, such as the spring adaptor 446 and the actuator 444.

Figure 5A:
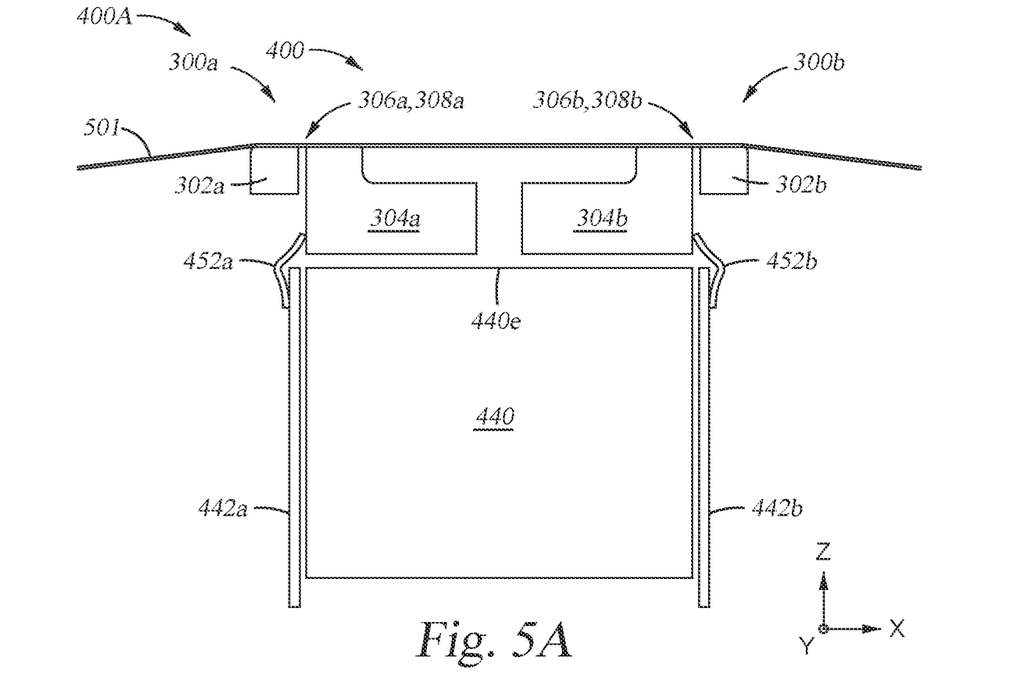
FIGS. 5A-5D illustrate cross-sectional view of layout variations of the first and second SGV modules disposed on the beam of the tape head assembly of FIG. 4A, according to various embodiments.

While some details are shown only in FIG. 5A, each of various layouts 400A-400D comprise the first and second modules 300a, 300b disposed on the beam 440. The first module 300a comprises a first closure 302a, a first substrate 304a, and a plurality of writers 306a and readers 308a disposed therebetween. Similarly, the second module 300b comprises a second closure 302b, a second substrate 304b, and a plurality of writers 306b and readers 308b disposed therebetween. First wiring bonding connects the first module 300a to the first FPC board 442a, and second wiring bonding connects the second module 300b to the second FPC board 442b. The first module 300a writes and reads data from a tape 501 in a first or forward direction of the tape (e.g., the x-direction), and the second module 300b writes and reads data from the tape in a second or reverse direction of the tape (e.g., the −x-direction), where the reverse direction is opposite to the forward direction.

FIG. 5A illustrates a first layout 400A of the tape head assembly 400, according to one embodiment. In the first layout 400A, the first and second modules 300a, 300b are disposed on the beam 440 without being tilted (e.g., flat or tilted 0 degrees). In other words, the MFS of the first and second modules 300a, 300b is parallel to a fifth surface 440e of the beam 440.

Figure 5B:
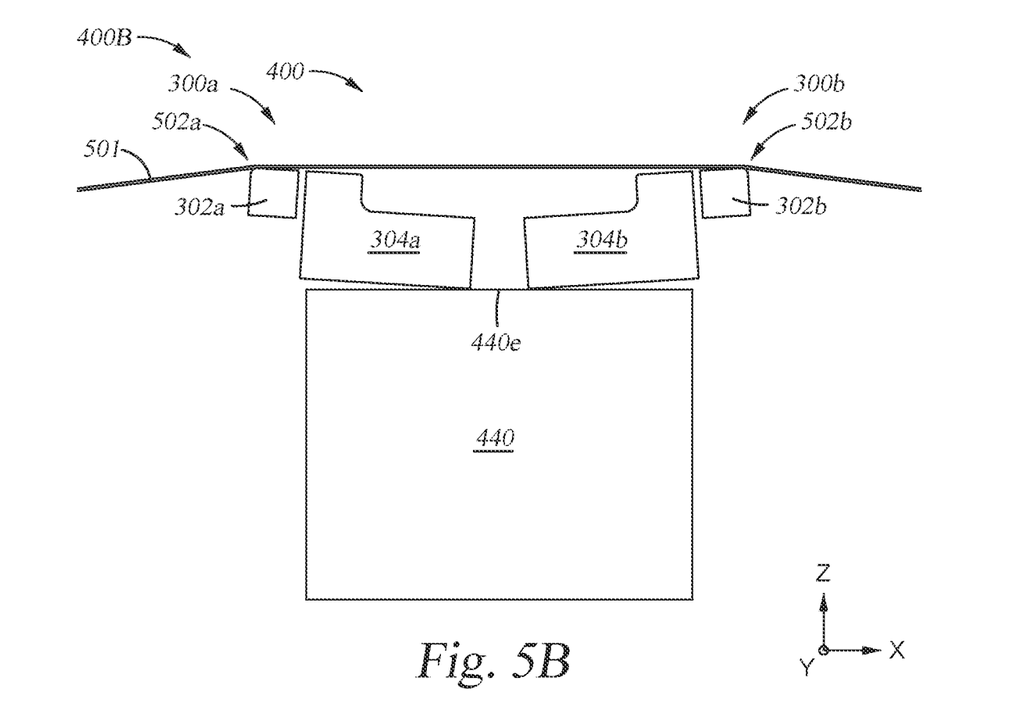

FIG. 5B illustrates a second layout 400B of the tape head assembly 400, according to another embodiment. In the second layout 400B, the first and second modules 300a, 300b are each tilted upwards with respect to the fifth surface 440e less than or equal to about 2 degrees such that the first and second closures 302a, 302b are slightly higher than the first and second substrates 304a, 304b, respectively. In such an embodiment, during operation, a first skiving edge 502a of the tape 501 is the outer edge or corner of the first closure 302a, and a second skiving edge 502b of the tape 501 is the outer edge or corner of the second closure 302b.

Figure 5C:
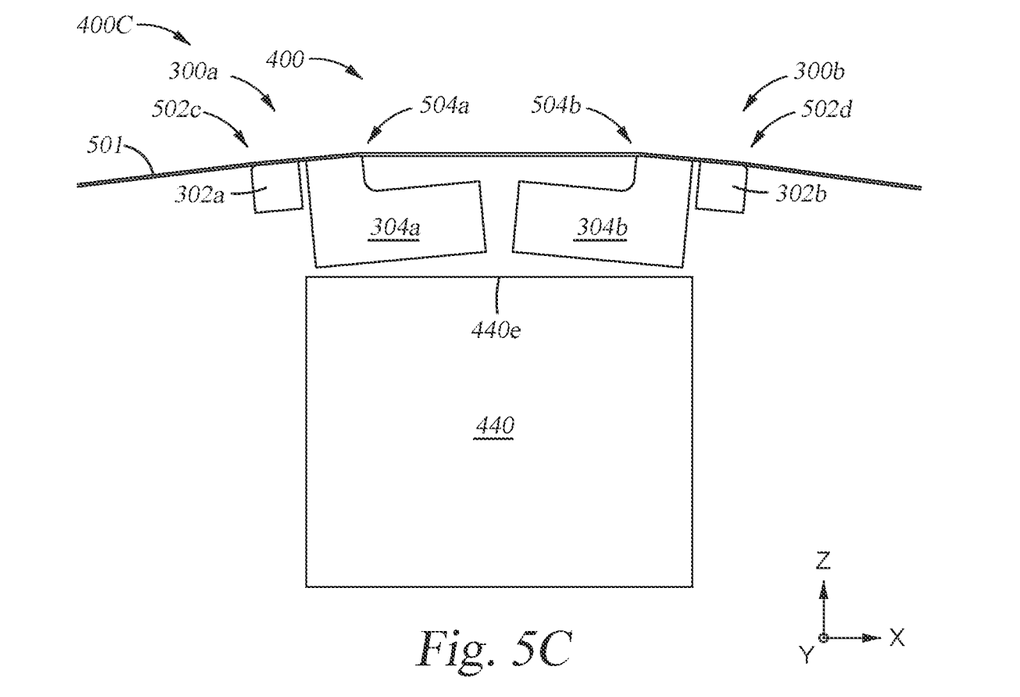

FIG. 5C illustrates a third layout 400C of the tape head assembly 400, according to yet another embodiment. In the third layout 400C, the first and second modules 300a, 300b are both tilted downwards with respect to the fifth surface 440e such that the inner corner of the first and second substrates 304a, 304b are slightly higher than the outer corners of the first and second closures 302a, 302b. In such an embodiment, during operation, a first skiving edge 504a of the tape 501 is the inner edge or corner of the first substrate 304a, and a second skiving edge 502b of the tape 501 is the inner edge or corner of the second substrate 304b. The tape 501 wraps around the outer corner 502c of the first closure 302a and the outer corner 502d of the second closure 302b during operation. The first and second modules 300a, 300b are tilted at an angle that is less than the tape wrap angle around the outer corners 502c, 502d of the first and second closures 302a, 302b. Moreover, in the third layout 400C, both the first and second modules 300a, 300b can write and read in both the forward and reverse direction.

Figure 5D:
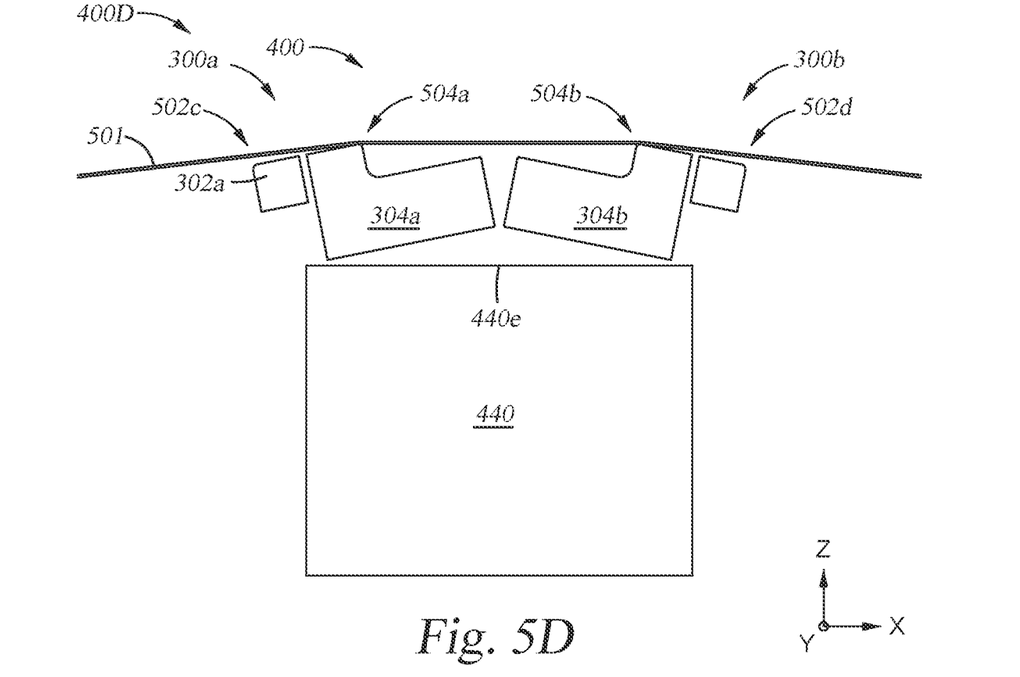

FIG. 5D illustrates a fourth layout 400D of the tape head assembly 400, according to another embodiment. In the fourth layout 400D, the first and second modules 300a, 300b are both tilted downwards with respect to the fifth surface 440e such that the inner corner of the first and second substrates 304a, 304b are slightly higher than the outer corners of the first and second closures 302a, 302b. In such an embodiment, during operation, a first skiving edge 504a of the tape 501 is the inner edge or corner of the first substrate 304a, and a second skiving edge 502b of the tape 501 is the inner edge or corner of the second substrate 304b. The tape 501 wraps around the outer corner 502c of the first closure 302a and the outer corner 502d of the second closure 302b during operation. The first and second modules 300a, 300b are tilted at an angle that is greater than the tape wrap angle around the outer corners 502c, 502d of the first and second closures 302a, 302b. Thus, the third and fourth layouts 400c, 400D are similar; however, the tilt angle of the modules 300a, 300b in the third layout 400C is less than the tape wrap angle, whereas the tilt angle of the modules 300a, 300b in the fourth layout 400D is greater than the tape wrap angle.

Therefore, by placing both the first module and the second module on the same beam, and by utilizing the spring adaptor and the actuator to move the beam, the first and second modules may be accurately and finely positioned with respect to a tape to increase the TPI capability of the tape head assembly. By compressing or expanding the actuator to move the beam, the spring adaptor is able to provide stability to the first and second modules to ensure accurate, minute, or fine positioning of the first and second modules. Since both the first and second modules are disposed on the same beam, moving the beam using the actuator ensures the first and second modules are always aligned, and there is no need to align multiple modules disposed on separate beams.

In one embodiment, a tape head assembly comprises a beam, a first module disposed on the beam, the first module comprising a first plurality of write transducers and a first plurality of read transducers, a second module disposed on the beam adjacent to the first module, the second module comprising a second plurality of write transducers and a second plurality of read transducers, an actuator disposed in contact with a first end of the beam, the actuator being controllable to move the beam in a first direction towards a second end of the beam and a second direction opposite to the first direction, the second end of the beam being opposite the first direction, and a spring adaptor disposed around the beam and the actuator.

A first end of the first module disposed near the actuator and a second end the first module disposed opposite the first end are each individually beveled about 3 degrees to about 10 degrees, and a first end of the second module disposed near the actuator and a second end the second module disposed opposite the first end are each individually beveled about 3 degrees to about 10 degrees. The actuator is a piezoelectric actuator. The spring adaptor, the beam, and the actuator are recessed from a media facing surface. The spring adaptor comprises a spring member, and wherein the beam is disposed in contact with the spring member. The first module is controllable to write data to a media using the first plurality of write transducers and to read verify the data using the first plurality of read transducers, and wherein the second module is controllable to write data to a media using the second plurality of write transducers and to read verify the data using the second plurality of read transducers. A tape drive comprising the tape head assembly.

In another embodiment, a tape head assembly comprises a spring adaptor, the spring adaptor comprising a first hole, a second hole, and a spring member disposed between the first hole and the second hole, a beam disposed within the first hole of the spring adaptor, the beam being disposed in contact with the spring member, a first module disposed on the beam, the first module comprising a first plurality of write transducers and a first plurality of read transducers, a second module disposed on the beam adjacent to the first module, the second module comprising a second plurality of write transducers and a second plurality of read transducers, and an actuator disposed in the first hole adjacent to a first end of the beam, the actuator being controllable to move the beam in a first direction towards the spring member and a second direction opposite to the first direction.

The first module and the second module are each individually tilted upwards with respect to a first surface of the beam less than or equal to about 2 degrees. The first module and the second module are each individually tilted downwards with respect to a first surface of the beam, the first module and the second module each being disposed on the first surface of the beam. A tilt angle of the first module and the second module is less than a wrap angle of a media. A tilt angle of the first module and the second module is greater than a wrap angle of a media. A media facing surface of the first module and the second module is substantially parallel to a first surface of the beam, the first module and the second module each being disposed on the first surface of the beam. The spring member has a width of about 0.08 mm to about 0.4 mm. A tape drive comprising the tape head assembly.

In yet another embodiment, a tape drive comprises a tape head assembly, the tape head assembly comprising: a spring adaptor, the spring adaptor comprising a first hole, a second hole, and a spring member disposed between the first hole and the second hole, a beam disposed within the first hole of the spring adaptor, the beam being disposed in contact with the spring member, a first same gap verify (SGV) module disposed on the beam, the first SGV module comprising a first plurality of write transducers and a first plurality of read transducers, a second SGV module disposed on the beam adjacent to the first SGV module, the second SGV module comprising a second plurality of write transducers and a second plurality of read transducers, and an actuator disposed in the first hole, the actuator being disposed in contact with a first surface of the beam, and a controller configured to: control the actuator to move the beam in a first direction transverse to a direction a media moves and a second direction opposite to the first direction, control the first SGV module to write data to the media using the first plurality of write transducers and the read verify the data using the first plurality of read transducers, and control the second SGV module to write data to the media using the second plurality of write transducers and the read verify the data using the second plurality of read transducers.

The tape head further comprises a stepping motor coupled to the tape head assembly, and a voice coil motor coupled to the tape head assembly. The tape head assembly further comprises: a first flexible printed circuit (FPC) board disposed adjacent to a second surface of the beam, and a second FPC board disposed adjacent to a third surface of the beam, the third surface of the beam being opposite the second surface. The spring adaptor comprises alumina and has a length of about 9 mm to about 25 mm. The first hole of the spring adaptor has a greater length than the second hole of the spring adaptor. The tape head is statically tilted about 3 degrees to about 10 degrees. The controller is further configured to dynamically tilt the tape head assembly about 0.3 degrees to about 1.5 degrees in the first direction and the second direction.

While the foregoing is directed to embodiments of the present disclosure, other and further embodiments of the disclosure may be devised without departing from the basic scope thereof, and the scope thereof is determined by the claims that follow.

What is claimed is:

1. A tape head assembly, comprising:
   a beam;
   a first module disposed on the beam, the first module comprising a first plurality of write transducers and a first plurality of read transducers;
   a second module disposed on the beam adjacent to the first module, the second module comprising a second plurality of write transducers and a second plurality of read transducers;
   an actuator disposed in contact with a first end of the beam, the actuator being controllable to move the beam in a first direction towards a second end of the beam and a second direction opposite to the first direction, the second end of the beam being opposite the first direction; and
   a spring adaptor disposed around the beam and the actuator.

2. The tape head assembly of claim 1, wherein a first end of the first module disposed near the actuator and a second end the first module disposed opposite the first end are each individually beveled about 3 degrees to about 10 degrees, and wherein a first end of the second module disposed near the actuator and a second end the second module disposed opposite the first end are each individually beveled about 3 degrees to about 10 degrees.

3. The tape head assembly of claim 1, wherein the actuator is a piezoelectric actuator.

4. The tape head assembly of claim 1, wherein the spring adaptor, the beam, and the actuator are recessed from a media facing surface.

5. The tape head assembly of claim 1, wherein the spring adaptor comprises a spring member, and wherein the beam is disposed in contact with the spring member.

6. The tape head assembly of claim 1, wherein the first module is controllable to write data to a media using the first plurality of write transducers and to read verify the data using the first plurality of read transducers, and wherein the second module is controllable to write data to a media using the second plurality of write transducers and to read verify the data using the second plurality of read transducers.

7. A tape drive comprising the tape head assembly of claim 1.

8. A tape head assembly, comprising:
   a spring adaptor, the spring adaptor comprising a first hole, a second hole, and a spring member disposed between the first hole and the second hole;
   a beam disposed within the first hole of the spring adaptor, the beam being disposed in contact with the spring member;
   a first module disposed on the beam, the first module comprising a first plurality of write transducers and a first plurality of read transducers;
   a second module disposed on the beam adjacent to the first module, the second module comprising a second plurality of write transducers and a second plurality of read transducers; and an actuator disposed in the first hole adjacent to a first end of the beam, the actuator being controllable to move the beam in a first direction towards the spring member and a second direction opposite to the first direction.

9. The tape head assembly of claim 8, wherein the first module and the second module are each individually tilted upwards with respect to a first surface of the beam less than or equal to about 2 degrees.

10. The tape head assembly of claim 8, wherein the first module and the second module are each individually tilted downwards with respect to a first surface of the beam, the first module and the second module each being disposed on the first surface of the beam.

11. The tape head assembly of claim 10, wherein a tilt angle of the first module and the second module is less than a wrap angle of a media.

12. The tape head assembly of claim 10, wherein a tilt angle of the first module and the second module is greater than a wrap angle of a media.

13. The tape head assembly of claim 8, wherein a media facing surface of the first module and the second module is substantially parallel to a first surface of the beam, the first module and the second module each being disposed on the first surface of the beam.

14. The tape head assembly of claim 8, wherein the spring member has a width of about 0.08 mm to about 0.4 mm.

15. A tape drive comprising the tape head assembly of claim 8.

16. A tape drive, comprising:
a tape head assembly, the tape head assembly comprising:
  a spring adaptor, the spring adaptor comprising a first hole, a second hole, and a spring member disposed between the first hole and the second hole;
  a beam disposed within the first hole of the spring adaptor, the beam being disposed in contact with the spring member;
  a first same gap verify (SGV) module disposed on the beam, the first SGV module comprising a first plurality of write transducers and a first plurality of read transducers;
  a second SGV module disposed on the beam adjacent to the first SGV module, the second SGV module comprising a second plurality of write transducers and a second plurality of read transducers; and
  an actuator disposed in the first hole, the actuator being disposed in contact with a first surface of the beam; and
a controller configured to:
  control the actuator to move the beam in a first direction transverse to a direction a media moves and a second direction opposite to the first direction;
  control the first SGV module to write data to the media using the first plurality of write transducers and the read verify the data using the first plurality of read transducers; and
  control the second SGV module to write data to the media using the second plurality of write transducers and the read verify the data using the second plurality of read transducers.

17. The tape drive of claim 16, further comprising:
a stepping motor coupled to the tape head assembly; and
a voice coil motor coupled to the tape head assembly.

18. The tape drive of claim 16, wherein the tape head assembly further comprises:
a first flexible printed circuit (FPC) board disposed adjacent to a second surface of the beam; and
a second FPC board disposed adjacent to a third surface of the beam, the third surface of the beam being opposite the second surface.

19. The tape drive of claim 16, wherein the spring adaptor comprises alumina and has a length of about 9 mm to about 25 mm.

20. The tape drive of claim 16, wherein the first hole of the spring adaptor has a greater length than the second hole of the spring adaptor.

21. The tape drive of claim 16, wherein the tape head is statically tilted about 3 degrees to about 10 degrees.

22. The tape drive of claim 16, wherein the controller is further configured to dynamically tilt the tape head assembly about 0.3 degrees to about 1.5 degrees in the first direction and the second direction.

* * * * *